Figure 1:
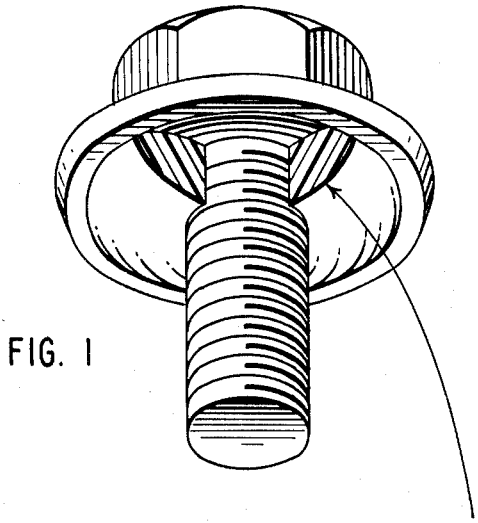

April 26, 1966   R. J. GREENLEAF ETAL   3,247,752
SEALING OR CUSHION FASTENER
Filed Dec. 10, 1963

POLYVINYL CHLORIDE CROSS-LINKED
BY POLYIMIDAZOLINE-BENTONITE
CLAY COMPLEX

INVENTORS
Richard J. Greenleaf & Edward J. Conklin
BY
Kenway, Jenney & Hildreth
Att'ys.

United States Patent Office 3,247,752
Patented Apr. 26, 1966

3,247,752
SEALING OR CUSHION FASTENER
Richard J. Greenleaf, Ipswich, Mass., and Edward J. Conklin, Oakville, Ontario, Canada, assignors to L. J. Barwood Manufacturing Co. Inc., Everett, Mass., a corporation of Massachusetts
Filed Dec. 10, 1963, Ser. No. 329,533
1 Claim. (Cl. 85—1)

This invention comprises a new and improved headed fastener carrying a sealing ring of special composition which imparts to the fastener characteristics of important advantage from the standpoints of economy, efficiency in use and reuse as well as convenience in driving or setting.

For many years there has been available to the industry a multitude of different fasteners containing sealing or cushioning washers of asbestos, rubber or plastic compounds but all of these have been restricted in their field of use for one reason or another. From the economic standpoint price is an important factor. A difference in cost of two or three cents per thousand fasteners has often discouraged the use of fasteners otherwise superior in sealing or driving quality. Many sealing compounds heretofore available have been found to fail by softening or dissolving or otherwise deteriorating when subjected to contact of oil, hydraulic fluid or oxidizing vapors. Such sealing or cushioning material as asbestos has not been sufficiently flowable to fill all the interstices of the compound. Other compounds have proved deficient in their adhesive characteristics or have caused stripping of the threads in the fastener material.

The present invention is based upon our discovery that a specific cross-linked polyvinyl derivative, when used as an adherent sealing ring beneath the head of a fastener, obviates all the disadvantages above discussed and possesses of itself unforeseen and unpredictable advantages which have led to the production of a sealing fastener of universal application that may be produced at extremely low cost.

Among the advantages of this compound when used with a headed fastener is its adhesive characteristic. When applied as a washer to its under face of a metal fastener head and cured in situ it makes a faster and more powerful bond than any otherwise suitable adhesive we have been able to discover. This characteristic renders the fasteners capable of reuse since the shape and integrity of the sealing washer is not impaired by the rotary drag and pressure of setting up the fastener. When a fastener is removed after one or more uses the sealing ring or washer remains intact in position with the fastener ready for immediate reuse.

In this connection it should be noted that the compound will bond securely to an oily or greasy surface where other plastics, such as neoprene, will make no bond at all.

Another advantage of our novel sealing compound in combination with a headed fastener is its capacity to flow into and fill the most minute cracks or cavities in the parts which the fastener unites. Other plastic compounds tend to bridge such cracks and so form a less perfect seal. For example, fasteners equipped with this compound have been found effective when used in the construction of aluminum frames for duo-pane windows, whereas all other sealing compounds heretofore tried have failed to make or to maintain a vaporproof seal against the formation of condensation.

Still another advantage of our sealing compound in this connection is its high resistance to heat. Exhaustive tests show no impairment of such a sealed fastener when subjected for twenty-four hours at 400° F.

In the accompanying drawings we have shown two examples of threaded fasteners in each of which is incorporated a sealing ring of our new and improved composition. In the drawings—

Figure 3:
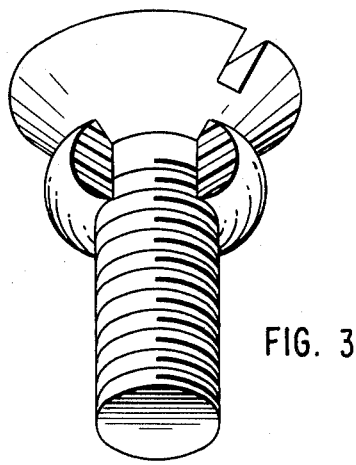
Figure 2:
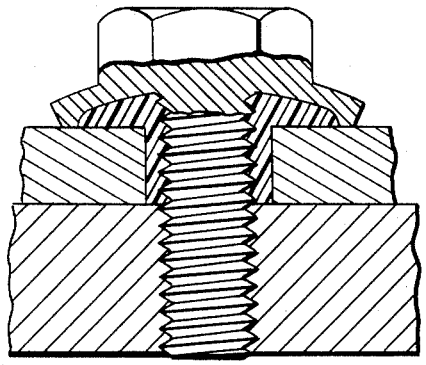
Figure 4:
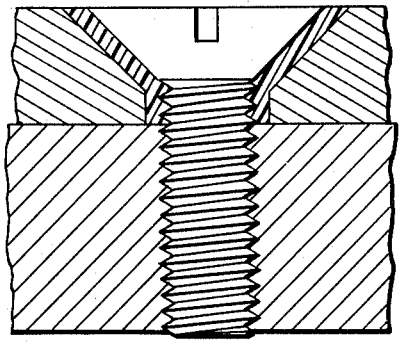

FIGS. 1 and 2 depict a machine screw with indented hex washer head shown in space and in use, and FIGS. 3 and 4 similarly depict a flat head machine screw with sealing ring.

Our novel sealing compound may be generally described as halogenated polymer (e.g., vinyl chloride polymer or vinyl chloride copolymer) plastisols which are modified by the addition of a polyimidazoline-bentonite clay complex as a cross-linking agent and which when cured have an improved adhesion and become a thermoset rather than a thermoplastic product. These polymeric plastisol compositions are fluid at room temperature but solidify to infusible and insoluble products. Plasticizers for the halogenated polymer may be added to the complex or to the uncured polymeric mixture preferably to the extent of about 20 to 60 percent by weight of the final composition. Representative plasticizers include dioctyl phthalate, tricresyl phosphate, dioctyl adipate, esters of lower alkyl alcohols and fatty acids, and epoxidized triglycerides such as epoxidized soybean oil and epoxidized castor oil. The plastisols can also contain the usual fillers, thickeners, blowing agents, diluents, and the like.

The polyimidazoline-bentonite clay complex can be prepared in various ways. For example, dried bentonite clay can be mixed with a polyimidazoline and reaction takes place at room temperature and higher to give the complex. Undried bentonite may be mixed with the polyimidazoline and the mixture heated to drive off the surface water of the clay to give the complex. Alternatively, the dried bentonite and polyimidazoline can be separately added to the polymeric system. A still further method is to disperse a semi-solid polyimidazoline and pre-dried bentonite in a plasticizer, such as epoxidized triglycerides of vegetable oil fatty acids, and the resulting dispersion can be blended, for example, with dispersion grade polyvinylchloride to give a smooth fluid plastisol.

The polyimidazolines can also be defined as 2-substituted-2-imidadolines or 1,2-disubstituted-2-imidazolines in which the substitutes can be, for example, hydrogen, alkyl groups, alkyl groups derived from carboxylic acids, aliphatic ester groups, polyamine groups, other 2-substituted-2-imidazoline or 1,2 - disubstituted - 2 - imidazoline groups, and the like. The polyimidazolines may be prepared generally by contacting appropriate amounts of an alkylene diamine or polyalkylene polyamine and monoand dicarboxylic acids under reactive conditions such as a temperature between 180° C. and 240° C. and a pressure between 0.1 mm. and 50 mm. of mercury. Typical amines include ethylene and propylene diamine, diethylene and dipropylene triamine, triethylene tetramine and the like. Representative acids include acetic, caproic, lauric, oleic, stearic, dimerized fatty acids, adipic, suberic, azelaic, and sebacic acids, and mixtures thereof. The preferred polyimidazolines are those which in themselves are essentially non-volatile and chemically stable at curing temperatures.

In general, the headed fastener is first lined with a suitable quantity of the fluid polymeric composition at room temperature the quantity being sufficient to encompass or surround the shank of the fastener under its head, cover a suitable portion of the underside of the head of the fastener, and sufficient at least to surround and preferably also fill the aperture that is to be sealed. If the head is undercut or recessed the polymeric composition will completely fill the undercut or recessed area of the head. The fastener is then heated by suitable means to cure the sealing compound, that is, at a temperature between about 150° C. to 250° C. for 60 seconds to 60 minutes.

Typical and satisfactory plastisols are as follows:

(A) A 100 percent solids polyvinyl chloride plastisol containing a polyimidazoline-bentonite clay complex as a crosslinking agent, dioctyle adipate as plasticizor, a blowing agent, zinc chromate as an adhesion promoter, and fillers. Viscosity 42,000 cps. at 60 r.p.m. (Brookfield—No. 4 spindle) at 78° F. and 200,000+ cps. at 6 r.p.m.; and a specific gravity (unpuffed) 1.545.

(B) A 100 percent solids polyvinyl chloride plastisol containing a polyimidazoline-bentonite clay complex as a crosslinking agent, dioctyle phthalate as plasticizor, a blowing agent, zinc chromate as an adhesion promoter, and fillers. Viscosity 20,000–25,000 cps. at 60 r.p.m. (Brookfield—No. 4 spindle) at 78° F. and 125,000+ cps. at 6 r.p.m.; and a specific gravity (unpuffed) 1.26.

(C) A 100 percent solids polyvinyl chloride plastisol containing a polyimidazoline-bentonite clay complex as a crosslinking agent, dioctyle adipate as plasticizor, a blowing agent, and zinc chromate as an adhesion promoter. Viscosity 20,000 cps. at 60 r.p.m. (Brookfield—No. 4 spindle) at 78° F. and 135,000 cps. at 6 r.p.m.; and a specific gravity (unpuffed) 1.47.

A number of steel cadmium plated ¼–20 indented hex washer head machine screws, such as depicted in FIGS. 1 and 2, were each lined with 1/26 part by weight of formulation A above and cured in an oven at a temperature of about 204° C. for 3.5 minutes. The ring of sealing composition fills with some excess the recess or undercut area of the head as shown in FIG. 1. The Shore A hardness of the sealing composition after curing was 55 to 60. These fasteners were employed to join two aluminum metal sheets making good and vaporproof seals. When these same fasteners were repeatedly removed and reapplied equally satisfactory results were obtained.

Similar results were also obtained when flat headed fasteners of identical thread dimensions as depicted in FIGS. 3 and 4 were lined with 1/40 part by weight of the same formulation, and cured at about 204° C. for three minutes. Likewise, equally satisfactory results were obtained when these fasteners were lined and cured with formulation B and C with the resulting Shore A hardness being 40 to 45 and 55 to 60 respectively.

The polymeric compositions may contain between about 10 to 95, preferably 20 to 65, percent of halogenated polymer based on the weight of the total mixture.

The polyimidazoline-bentonite clay complex may be present in varying amounts but generally ranges between about 5% to 50% based on the weight of the polymeric composition, the remainder of the composition being constituted of the usual plasticizers and, if desired, an adhesion promoter and fillers. Satisfactory complexes for our purposes which may be assembled at room temperature with the fasteners comprise 20 to one part of bentonite clay to one part by weight of the polyimidazoline, with a preference for 4 to 1½ parts clay per part of the polyimidazoline.

Having thus disclosed our invention and described in detail an illustrative embodiment thereof, we claim as new and desire to secure by Letters Patent:

A metallic fastener having an enlarged head and an elongated shank and a cured-in-position sealing ring surrounding the shank and in contact with the underside of said head, said ring being formed of a polymeric plastisol composition comprising a polyvinyl chloride cross-linked by a polyimidazoline-bentonite clay complex, wherein said composition comprises between 10% and 95% of said plastisol and between 5% and 50% of said clay complex by weight, said clay complex consisting of between 1½ to 4 parts clay to one part polyimidazoline, said ring being adhesively joined in permanent union with the head and shank and further characterized by the ability of the said ring to be released from a workpiece surface against which the ring is compressed without seizure of the sealing substance or disruption of the ring when said fastener is unscrewed, thereby permitting repeated use of the fastener.

References Cited by the Examiner
UNITED STATES PATENTS

| | | | |
|---|---|---|---|
| 2,760,400 | 8/1956 | Mills et al. | |
| 2,773,043 | 12/1956 | Zukas | 260—3.3 |
| 2,983,534 | 5/1961 | Heller | 85—1 |
| 3,093,655 | 6/1963 | Dearborn et al. | |
| 3,159,073 | 12/1964 | Dickie | 85—9 |

OTHER REFERENCES

"Atlas Sheeting Screws," published by Atlas Bolt and Screw Co., July 1962 (page 2).

Lado and Myers: Nonmetallic Materials, New York, McGraw-Hill, 2nd edition, 1951, page 100.

"Parker-Kalon Staps," published by Parker-Kalon Corp., February 1958, page 1.

CARL W. TOMLIN, *Primary Examiner.*

M. HENSON WOOD, Jr., *Examiner.*

R. S. BRITTS, *Assistant Examiner.*